United States Patent
Keum et al.

(10) Patent No.: US 9,692,805 B2
(45) Date of Patent: Jun. 27, 2017

(54) METHOD AND APPARATUS OF PROVIDING BROADCASTING AND COMMUNICATION CONVERGENCE SERVICE

(71) Applicant: Samsung Electronics Co. Ltd., Suwon-si, Gyeonggi-do (KR)

(72) Inventors: Ji-Eun Keum, Suwon-si (KR); Young-Sun Ryu, Seongnam-si (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 13/954,115

(22) Filed: Jul. 30, 2013

(65) Prior Publication Data

US 2014/0040424 A1     Feb. 6, 2014

(30) Foreign Application Priority Data

Jul. 31, 2012   (KR) .................. 10-2012-0083755

(51) Int. Cl.
| | | |
|---|---|---|
| *G06F 15/16* | (2006.01) | |
| *H04L 29/08* | (2006.01) | |
| *H04N 21/434* | (2011.01) | |
| *H04N 21/4722* | (2011.01) | |
| *H04N 21/858* | (2011.01) | |

(52) U.S. Cl.
CPC ............ *H04L 67/10* (2013.01); *H04L 67/303* (2013.01); *H04L 67/306* (2013.01); *H04L 67/34* (2013.01); *H04N 21/4345* (2013.01); *H04N 21/4722* (2013.01); *H04N 21/8586* (2013.01)

(58) Field of Classification Search
None
See application file for complete search history.

(56) References Cited

U.S. PATENT DOCUMENTS

| | | | |
|---|---|---|---|
| 2003/0217369 A1* | 11/2003 | Heredia | ................... 725/152 |
| 2012/0177067 A1 | 7/2012 | Cho et al. | |
| 2012/0233235 A1* | 9/2012 | Allaire | ............. G06F 8/36 709/201 |

FOREIGN PATENT DOCUMENTS

| | | |
|---|---|---|
| KR | 10-0855623 B1 | 8/2008 |
| KR | 10-1021879 B1 | 3/2011 |
| KR | 10-2011-0120711 A | 11/2011 |
| WO | 2008-084976 A1 | 7/2008 |

OTHER PUBLICATIONS

Schwalb; iTV Scenarios; XP-002394424; ITV Handbook: Technologies and Standards; pp. 25-115, 117-159, and 609-633; Jan. 1, 2004; Upper Saddle River, NJ.

* cited by examiner

*Primary Examiner* — Scott B Christensen
(74) *Attorney, Agent, or Firm* — Jefferson IP Law, LLP

(57) ABSTRACT

An apparatus and method for providing a broadcasting and communication convergence service are provided. The method includes acquiring address information about an Internet server configured to provide an application customized based on user information and/or device information about a terminal, transmitting an application request message to the Internet server using the address information, receiving the customized application on a broadcast channel from the Internet server in response to the application request message, and consuming the customized application.

15 Claims, 8 Drawing Sheets

METHOD AND APPARATUS OF PROVIDING BROADCASTING AND COMMUNICATION CONVERGENCE SERVICE

CROSS-REFERENCE TO RELATED APPLICATION(S)

This application claims the benefit under 35 U.S.C. §119(a) of a Korean patent application filed on Jul. 31, 2012 in the Korean Intellectual Property Office and assigned Serial No. 10-2012-0083755, the entire disclosure of which is hereby incorporated by reference.

TECHNICAL FIELD

The present disclosure relates to provisioning of a broadcasting and communication convergence service in a communication system. More particularly, the present disclosure relates to an apparatus and method for enabling a user to receive a customized broadcasting service through a TeleVision (TV) connected to both a broadcast channel and a communication channel.

BACKGROUND

As time progresses, the present broadcasting and communication environments get more complicated. Furthermore, with continuing advances in their abilities, each technology is combined or converged with other technologies and a user is able to consume a plurality of content items in the convergence environment. Accordingly, a service provider configures a service with a plurality of content items and transmits the service in one or more paths over heterogeneous networks and the user can consume a convergence service in a broadcasting and communication convergence environment. For example, while the face of a news anchor is shown between a stock ticker and a news headline on a typical TV news screen, a user can search using a given keyword and view search results, while viewing a TV, in a convergence service.

Further, along with the development of communication technology and the increase of receiver performance, various user devices having a high-definition display the ability to access a plurality of heterogeneous networks at home or during movement by converging broadcasting and communication have been commercialized. However, there exists a need for a new transmission service that flexibly transmits a broadcasting and communication convergence service to a user and a user device in this environment.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for transmitting and receiving information in a communication network.

Another aspect of the present disclosure is to provide an apparatus and method for transmitting a customized TV application to a user or a user device from a broadcasting company in a broadcasting and communication convergence system.

Another aspect of the present disclosure is to provide an apparatus and method for transmitting information about characteristics of a user and a user device to a broadcasting company or an application provider on a broadband channel.

Another aspect of the present disclosure is to provide an apparatus and method for providing an application suitable for a situation of a user and/or a user device, when a broadcasting service and an application are provided on a broadcast channel.

In accordance with an aspect of the present disclosure, a method of providing a broadcasting and communication convergence service is provided. The method includes acquiring address information about an Internet server configured to provide an application customized based on user information and/or device information about a terminal, transmitting an application request message to the Internet server using the address information, receiving the customized application on a broadcast channel from the Internet server in response to the application request message, and consuming the customized application.

In accordance with another aspect of the present disclosure, a method of providing a broadcasting and communication convergence service is provided. The method includes receiving an application request message requesting an application customized based on user information and/or device information about a terminal on a broadcast channel from the terminal, configuring the customized application for the terminal using the user information and/or device information, and transmitting the customized application on the broadcast channel to the terminal.

In accordance with another aspect of the present disclosure, a terminal for receiving a broadcasting and communication convergence service is provided. The terminal includes a first interface configured to receive address information about an Internet server that provides an application customized based on user information and/or device information about the terminal by an Application Information Table (AIT) of an automatic start application provided on a broadcast channel by a broadcasting server, a second interface configured to transmit an application request message to the Internet server using the address information and to receive the customized application on a broadcast channel in response to the application request message, and an application processor configured to consume the customized application.

In accordance with another aspect of the present disclosure, an Internet server for providing a broadcasting and communication convergence service is provided. The Internet server includes a receiver configured to receive an application request message requesting an application customized based on user information and/or device information about a terminal, on a broadcast channel from the terminal, an application manager configured to configure the customized application for the terminal using the user information and/or device information, and a transmitter configured to transmit the customized application on the broadcast channel to the terminal.

In accordance with another aspect of the present disclosure, a method of providing a broadcasting and communication convergence service is provided. The method includes acquiring address information about an Internet server configured to provide a general-purpose application that is customizable according to user information and/or device information about a terminal, transmitting an application request message to the Internet server using the address information, receiving the general-purpose application on a broadcast channel from the Internet server in response to the application request message, configuring a customized application from the general-purpose application based on the user information and/or device information about the terminal, and consuming the customized application.

In accordance with another aspect of the present disclosure, a method of providing a broadcasting and communication convergence service is provided. The method includes receiving an application request message requesting a general-purpose application that is customizable based on user information and/or device information about a terminal, on a broadcast channel from the terminal, and transmitting the general-purpose application to the terminal.

In accordance with another aspect of the present disclosure, a method of providing a broadcasting and communication convergence service is provided. The method includes acquiring address information about a management server configured to provide an address of an application customized based on user information and/or device information about a terminal, transmitting an application request message to the management server using the address information, receiving the customized application on a broadcast channel from an application server of the Internet, and consuming the customized application.

In accordance with another aspect of the present disclosure, a method of providing a broadcasting and communication convergence service is provided. The method includes receiving an application request message requesting an application customized based on user information and/or device information about a terminal, on a broadcast channel from the terminal by a management server of the Internet, extracting address information about the customized application in response to the application request message, transmitting the application request message to an application server that stores the customized application using the address information, and transmitting the customized application to the terminal on the broadcast channel by the application server.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure will be provided to achieve the above-described technical aspects. In an exemplary implementation, defined entities may have the same names, to which the present disclosure is not limited. Thus, various embodiments of the present disclosure can be implemented as described or with ready modifications in a system having a similar technical background.

For the convenience, the following description is given using the names of entities defined in the Hybrid Broadcast Broadband TV (HbbTV) standard. However, this should not be construed as limiting the scope of the present disclosure. It is to be clearly understood that the present disclosure is also applicable to any system having a similar technical background.

Figure 1:
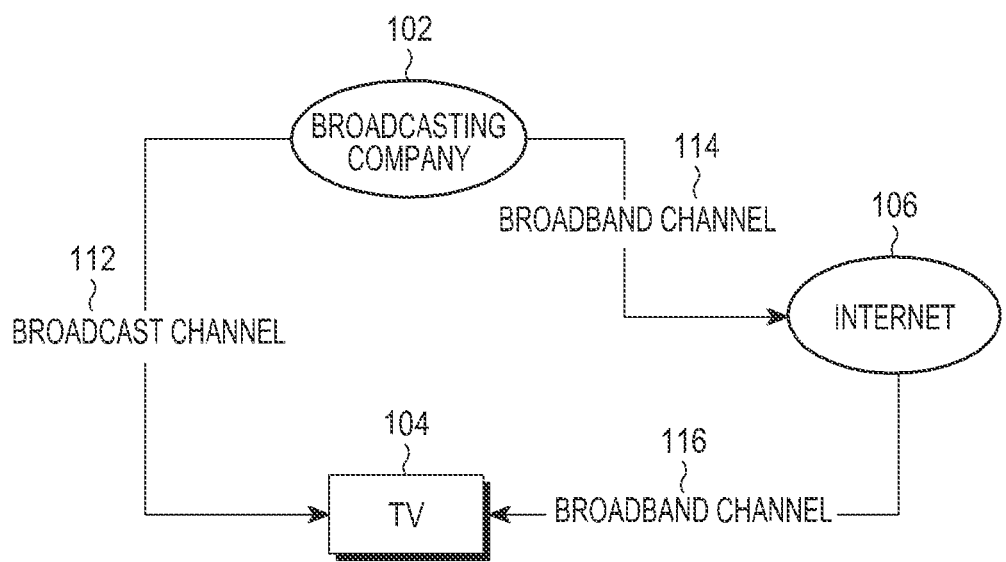
FIG. 1 illustrates a configuration of a Hybrid broadcast broadband TV (HbbTV) network according to an embodiment of the present disclosure.

FIG. 1 illustrates a configuration of an HbbTV network according to an embodiment of the present disclosure.

Referring to FIG. 1, a TV 104 may receive a broadcasting service including Audio and/or Video (A/V) content from a broadcasting station through a broadcast channel 112 and a broadband channel 116. The broadcast channel 112 refers to a channel provided over a broadcasting network. The broadband channel 116 may be an interactive channel provided over an interactive network such as a cellular system. A broadcasting company 102 transmits metadata of an application related to broadcast content by an Application Information Table (AIT). The application includes various types of information such as a Web page and an application program related to the broadcast content, which can be executed in the TV 104. The TV 104 may execute the application using the AIT. Content of the application may be provided to the TV 104 through at least one of the broadband channel 116 and the broadcast channel 112. If the application is provided through the broadband channel 116, the broadcasting company 102 (or an application provider) provides the application to the TV 104 over the Internet 106 connected through a broadband channel or other communications means (e.g. a backbone network) via a broadcast channel 114. The TV 104 may communicate with the broadcasting company 102 through at least one of the two channels during execution of the application.

Figure 2:
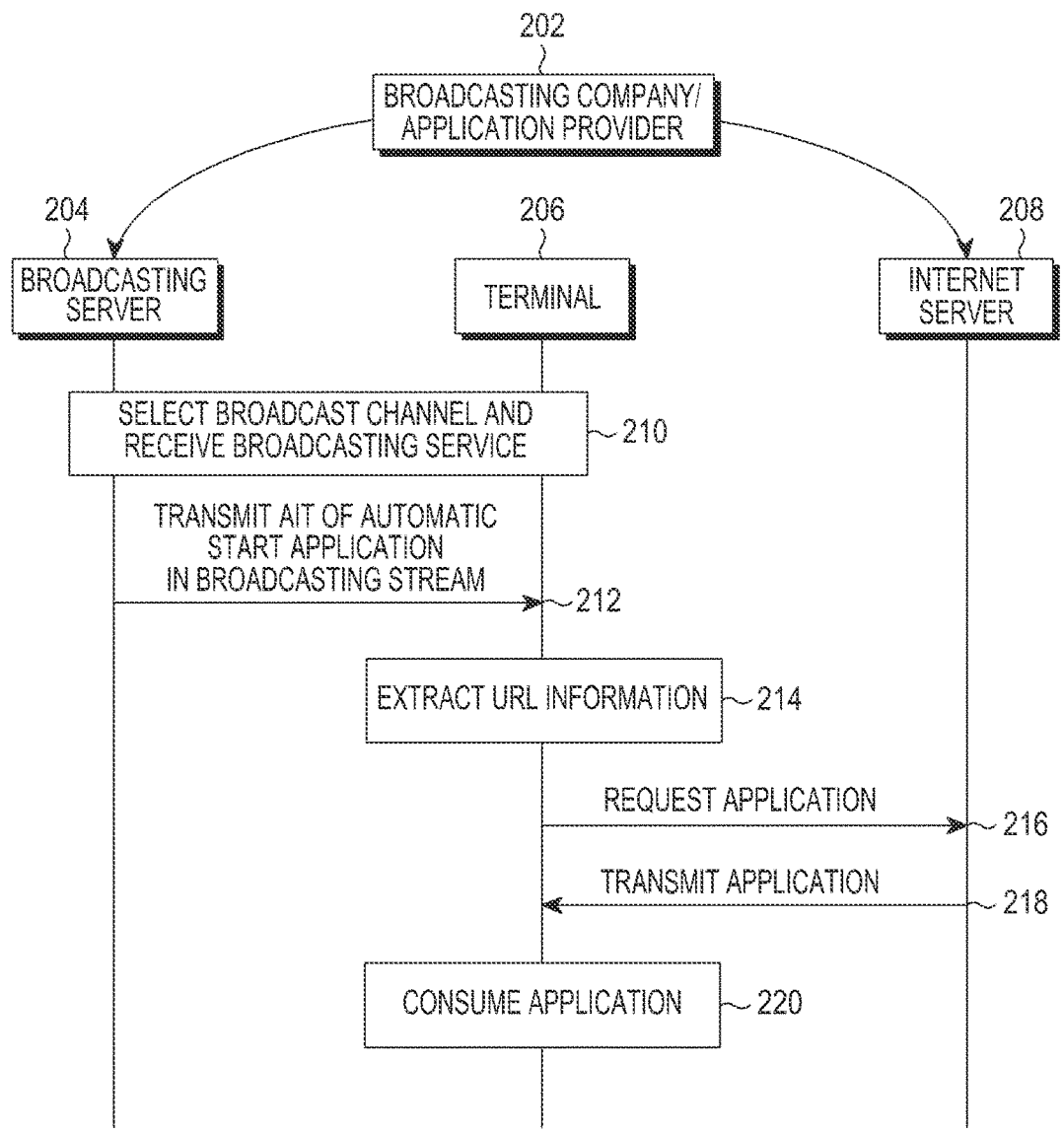
FIG. 2 illustrates an operation of enabling a user to use an application over a broadband network during broadcasting in a broadcasting and communication convergence environment according to an embodiment of the present disclosure.

FIG. 2 illustrates an operation of enabling a user to use an application over a broadband network during broadcasting in a broadcasting and communication convergence environment according to an embodiment of the present disclosure.

Referring to FIG. 2, a broadcasting company/application provider 202 has interfaces with a broadcasting server 204 that provides a broadcasting stream and an Internet server 208. A user terminal 206 may be, for example, a TV or a mobile device that can receive a broadcasting service. The terminal 206 selects a desired broadcast channel and starts to receive a broadcasting stream of a broadcasting service on the selected broadcast channel from the broadcasting server 204 at operation 210. At operation 212, the broadcasting server 204 transmits a broadcasting stream including an AIT of an automatic start application to the terminal 206.

At operation 214, the terminal 206 extracts the Internet address of the Internet server 208 that provides applications, for example, a Uniform Resource Locator (URL) or Uniform Resource Identifier (URI) from the AIT. The terminal 206 then requests an application to the Internet server 208 corresponding to the URL at operation 216. The Internet server 208 provides the requested application to the terminal 206 at operation 218 and the terminal 206 consumes, that is, executes the application at operation 220. The terminal 206 may communicate with the broadcasting company 202 through at least one of a broadcast channel and a broadband channel during execution of the application.

In the operation of FIG. 2, the terminal 206 is not allowed to transmit user information and/or device information about the terminal 206 to the Internet server 208 and the Internet server 208 provides a uniform application to the terminal 206 with no regard to the user environment and/or device environment of the terminal 206.

In an embodiment of the present disclosure, a terminal may receive an application which has been customized in consideration of a user environment and/or device environment of the terminal. For example, an application adapted to a screen size may be provided to a terminal, depending on whether the device type of the terminal is a TV or a mobile device. In another example, an application including information about famous restaurants or weather may be provided to a terminal according to the current location of the terminal. In another example, an application including an advertisement of a preferred product may be provided to a terminal according to the age, gender, and viewing history of a user of the terminal. An application may be customized in various manners, to which the present disclosure is not limited.

To receive a customized application to a terminal, the terminal acquires the address, i.e. URL of an Internet server configured to provide customized applications. The address of an Internet server capable of providing customized applications will be referred to as a customization URL and the Internet server is configured so as to configure a customized application based on user information or device information and provide the customized application to a terminal. The customization URL is provided to the terminal by the AIT of an automatic start application transmitted by a broadcasting server. In another embodiment, the customization URL may be transmitted in a different path, for example, through the Internet server or an offline leaflet, or pre-stored in the terminal.

Table 1 below illustrates an exemplary AIT including a customization URL.

TABLE 1

| | |
|---|---|
| application_type | As required, eg Flash or HTML |
| application_control_code | Not used |
| Customization URL | The server manages user/device data |
| Customization Parameter | The application can be customized with this parameter |
| application_descriptor( ) | |
|     application_profile_length | 0 (no application profile provided) |
|     service_bound_flag | Set as required |
|     visibility | Not used |
|     application_priority | Set as required |
|     transport_protocol_label | At least one |
| transport_protocol_descriptor( ) | |
|     protocol_id | 0x03 (broadband server) |
|     selector_bytes | Carry the min. application version |
| simple_application_location_descriptor( ) | |
|     initial_path_bytes | Parameters for the application |

Referring to Table 1, the AIT includes application type indicating the type of the application, for example, flash or Hyper Text Markup Language (HTML), application descriptor that describes the application, transport_protocol_descriptor that describes a transport protocol, and simple_application_location_descriptor indicating the position of the application. The AIT further includes Customization URL indicating the address of an Internet server that manages user information and/or device information and provides customized applications. In another embodiment of the present disclosure, the AIT may further include Customization Parameter that specifies a reference parameter used to customize an application. Customization Parameter may indicate, for example, at least one of device type, user location, user gender/age, and a viewing history as a reference used to customize an application in the Internet server or the terminal.

The terminal may transmit user information or device information to the Internet server indicated by the URL acquired from the AIT. In another embodiment of the present disclosure, the Internet server may acquire the user information or the device information about the terminal from a broadcasting server or a subscriber management server that manages subscription information about terminals. In another embodiment of the present disclosure, the Internet server may acquire the user information or the device information about the terminal by other means.

Figure 3A:
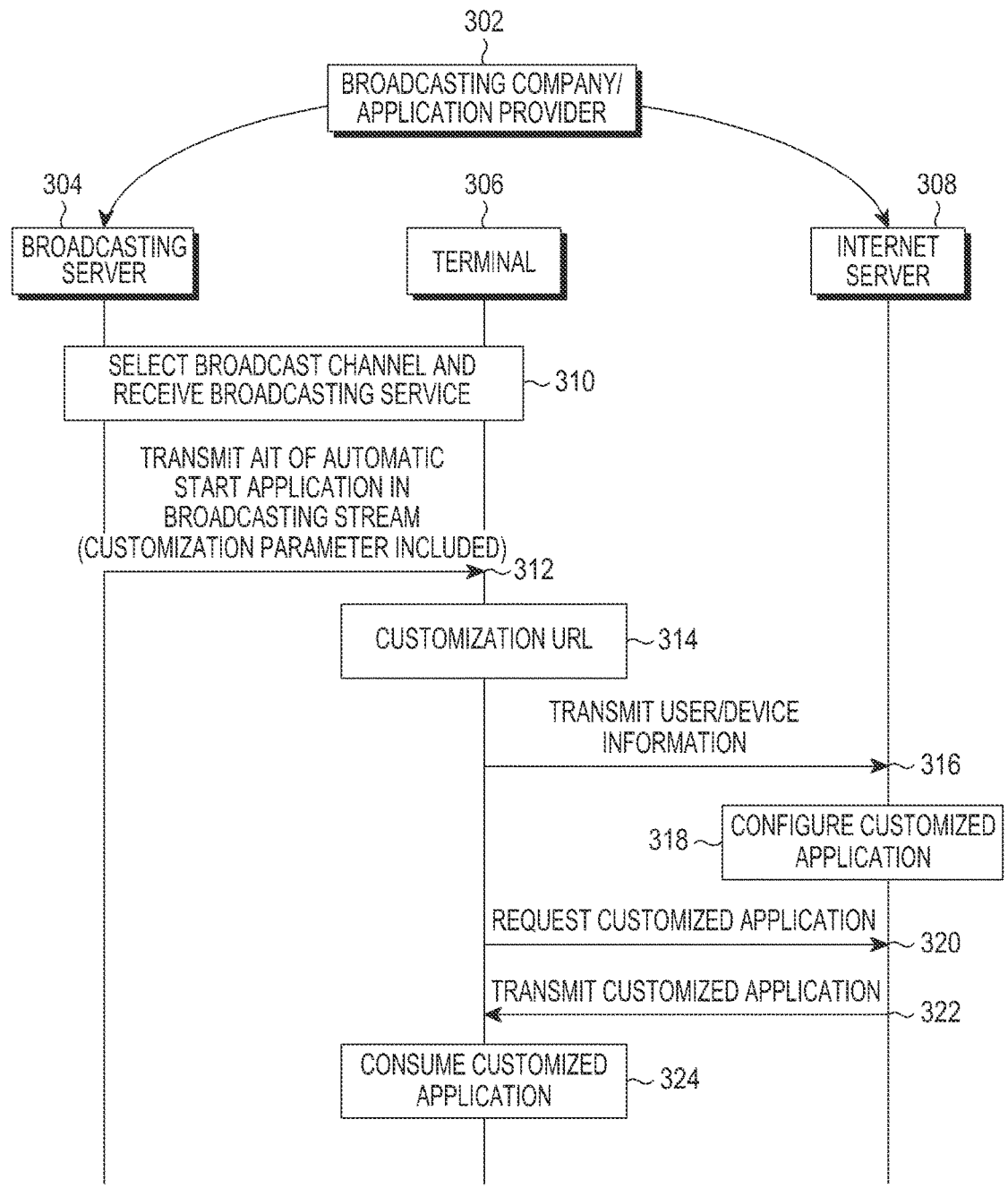
FIG. 3A illustrates an operation of providing a customized application according to an embodiment of the present disclosure.

FIG. 3A illustrates an operation of providing a customized application according to an embodiment of the present disclosure.

Referring to FIG. 3A, a terminal 306 selects a desired broadcast channel and starts to receive a broadcasting stream of a broadcasting service on the selected broadcast channel from a broadcasting server 304 at operation 310. At operation 312, the broadcasting server 304 transmits a broadcasting stream including an AIT of an automatic start application to the terminal 306, while the terminal 306 is receiving the broadcasting service. The AIT may include a customization URL. The AIT may further include a customization parameter, which is optional. In another embodiment of the present disclosure, the AIT includes a customization flag indicating whether a broadcasting company provides a customized application. In an embodiment of the present disclosure, a customization URL may be included in the AIT, when the customization flag is set to YES (e.g. '1'). At operation 314, the terminal 306 extracts the customization URL (or URI) from the AIT.

The terminal 306 transmits user information, device information, and/or a viewing history of the terminal 306 to an Internet server 308 indicated by the customization URL at operation 316. In an embodiment of the present disclosure, when the customization flag is set to '1' in the AIT, the terminal 306 transmits information required for customization to the server. The Internet server 308 configures an application customized to the terminal 306 using the received user information, device information, and/or viewing history of the terminal 306 at operation 318. The terminal 306 requests a customized application to the Internet server 308 corresponding to the position of the application (the customization URL) included in the AIT at operation 320. In an embodiment of the present disclosure, the terminal 306 may include the user information and/or device information (hereinafter, referred to as user/device information or customization information) of the terminal 306 in a message requesting the customized application. In this case, operation 316 is not performed. At operation 322, the Internet server 308 transmits the customized application to the terminal 306. The terminal 306 consumes, that is, executes the customized application at operation 324.

Now a description will be given of embodiments of transmitting customization information to an Internet server according to the present disclosure.

In an embodiment of the present disclosure, when a terminal requests an application to an Internet server, the terminal also transmits user/device information to the Internet server. The Internet server configures a customized application based on the user/device information and transmits the customized application to the terminal. In another embodiment of the present disclosure, a terminal may add user/device information to a URL included in a Hyper Text Transfer Protocol (HTTP) message requesting access to the Internet server. In another embodiment of the present disclosure, a terminal may add user/device information to an HTTP request header of an HTTP message.

For example, a case where a device type is dtv indicating a digital TV and location information indicating the location of a user is Suwon will be described.

If user/device information about the terminal is added to a URL extracted from an ATI, the URL is modified, in an HTTP message, to http://server ip/application.html?device=dtv®ion=suwon.

If the user/device information is included in an HTTP request header, the HTTP request header is extended as follows:

```
GET / HTTP 1.1
Host: server_ip
Accept: text/*
x-extension-device: dtv
x-extension-region: suwon
```

In another embodiment of the present disclosure, if the user/device information is included in a request body of an HTTP message, the user/device information is added in the following format:

```
POST / HTTP 1.1
Host: server_ip
Content-Type: text/plain
Content-Length: xx
Device=dtv®ion=suwon
```

Figure 3B:
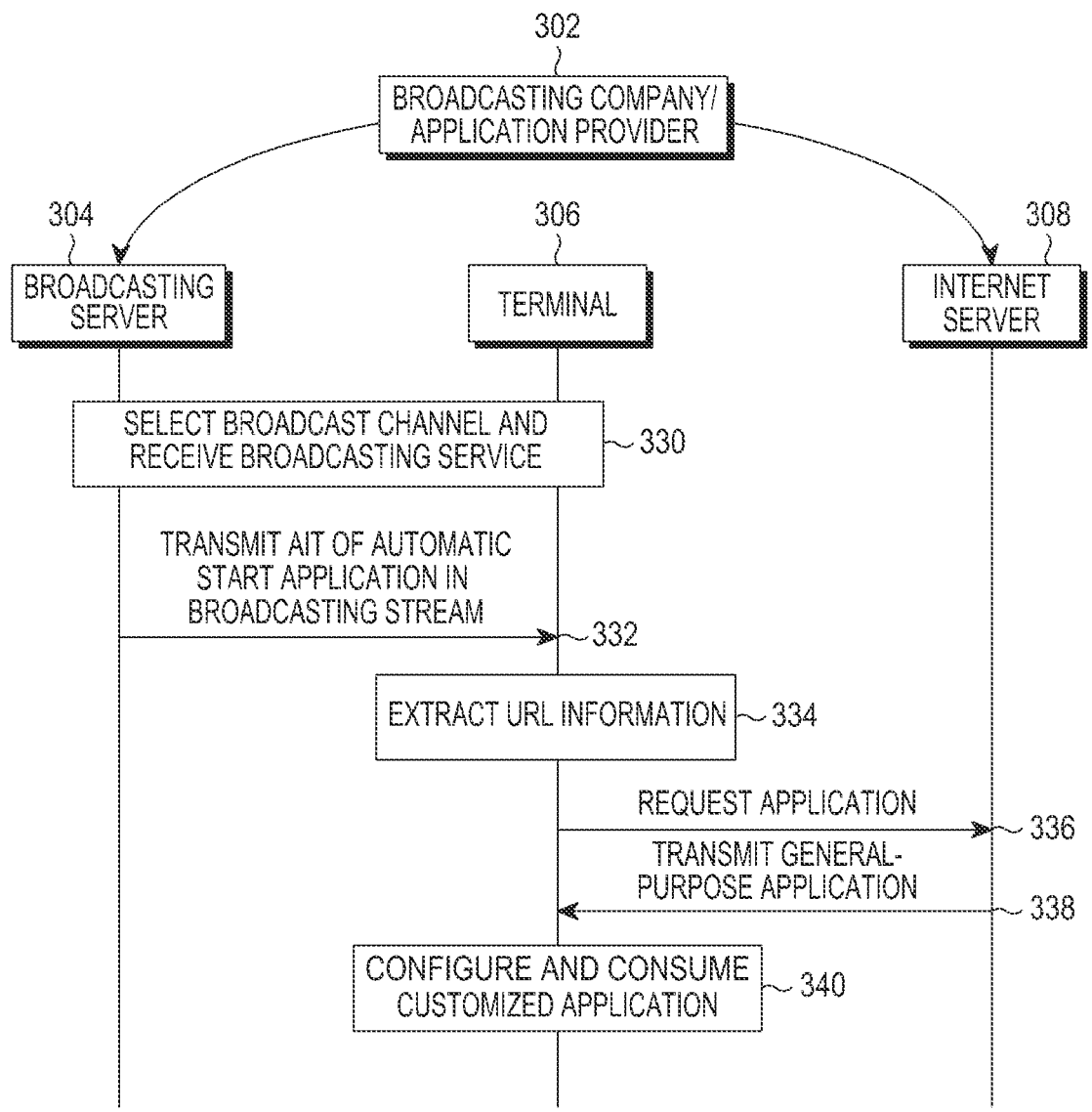
FIG. 3B illustrates an operation of providing a customized application according to an embodiment of the present disclosure.

FIG. 3B illustrates an operation of providing a customized application according to an embodiment of the present disclosure.

Referring to FIG. 3B, the terminal 306 selects a desired broadcast channel and starts to receive a broadcasting stream of a broadcasting service on the selected broadcast channel from the broadcasting server 304 at operation 330. At operation 332, the broadcasting server 304 transmits a broadcasting stream including an AIT of an automatic start application to the terminal 306, while the terminal 306 is receiving the broadcasting service. The AIT may include a customization URL. The AIT may further include an optional customization flag indicating whether a broadcasting company provides a customized application. The terminal 306 extracts the URL (or URI) of an Internet server that provides an application from the AIT at operation 334.

The terminal 306 requests an application to the Internet server 308 indicated by the position information (i.e. the URL) included in the AIT at operation 336. In an embodiment of the present disclosure, when the customization flag is set to YES (e.g. '1'), the terminal 306 may notify the Internet server 308 that the terminal 306 can customize an application, when requesting an application to the Internet server 308.

The Internet server 308 provides a general-purpose application that can be customized according to user/device information about the terminal 306 to the terminal 306 in response to the request of the terminal 306 at operation 338. The general-purpose application includes information related to various pieces of user/device information applicable to the terminal 306. In an embodiment of the present disclosure, the general-purpose application includes information related user/device information that can be acquired through a subscriber server of the terminal 306, the broadcasting company 302, or any other means.

At operation 340, the terminal 306 configures a customized application from the general-purpose application according to the user/device information about the terminal 306 by a media query of a Cascading Style Sheet (CSS) and consumes the customized application.

The followings are examples of CSS media queries available to the terminal 306. The CSS media queries are respectively for a case where a device type is mobile device, a case where a device type is dtv, and a case where a device type is dtv and the location of a user is Suwon.

```
@media screen and (device: mobile) {
}
@media screen and (device: dtv) {
}
@media screen and (device: dtv) and (region: suwon) {
}
```

Figure 4:
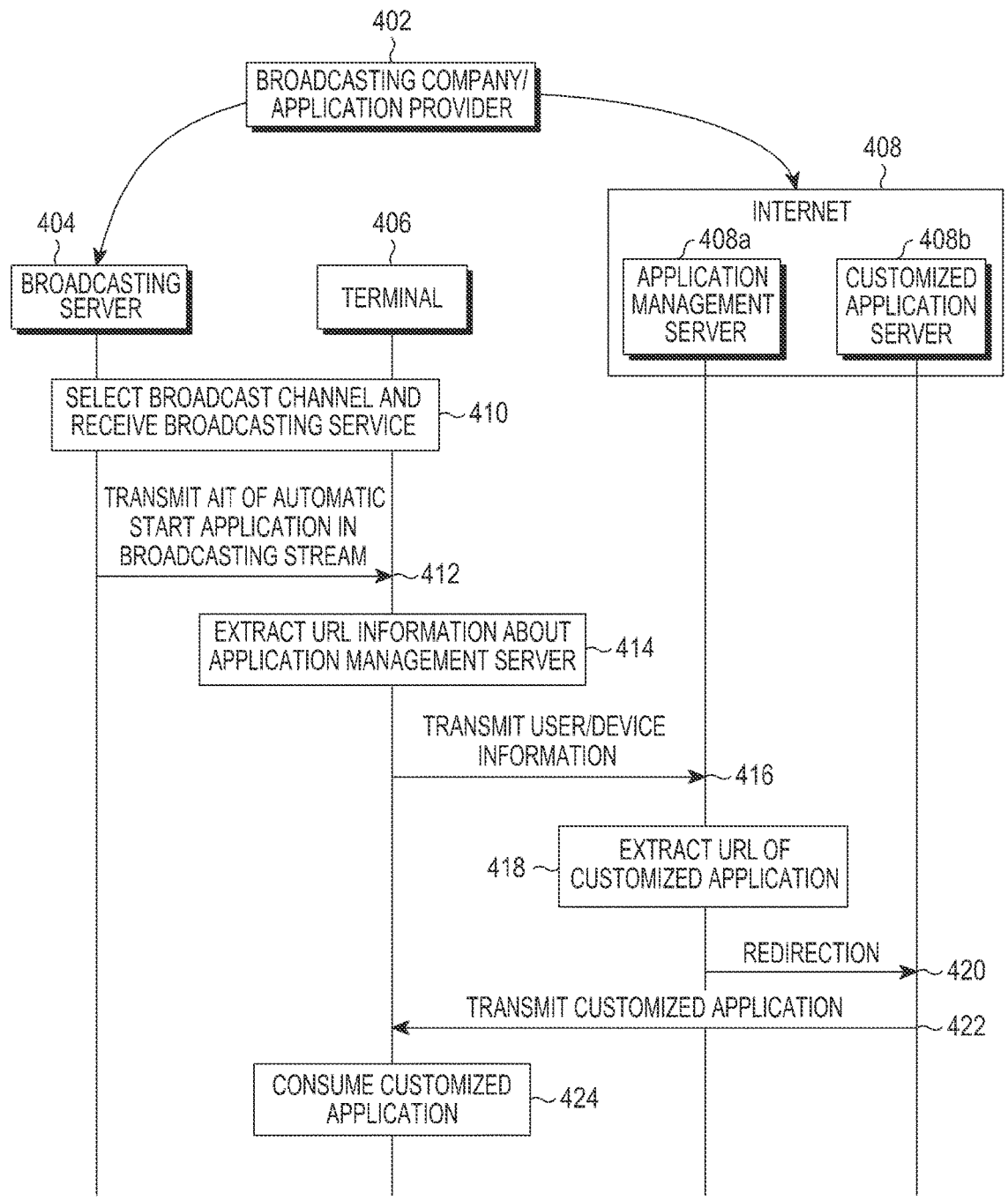
FIG. 4 illustrates an operation of providing a customized application according to an embodiment of the present disclosure.

FIG. 4 illustrates an operation of providing a customized application according to another embodiment of the present disclosure.

Referring to FIG. 4, a broadcasting company/application provider 402 has interfaces with a broadcasting server 404 that provides a broadcasting stream and an application management server 408a and a customized application server 408b of an Internet 408. The application management server 408a and the customized application server 408b are configured such that a terminal 406 may access them through a broadband channel. The application management server 408a stores and manages user/device information about terminals and stores information about the addresses of applications customized according to the user/device information about the terminals. The customized application server 408b stores various customized applications and provides a customized application in response to a command from the application management server 408a.

At operation 410, the terminal 406 selects a desired broadcast channel and starts to receive a broadcasting stream including content of a broadcasting service on the selected broadcast channel from the broadcasting server 404. While the terminal 406 is receiving the broadcasting service, the broadcasting server 404 transmits a broadcasting stream including an AIT of an automatic start application to the terminal 406 at operation 412. The AIT may include a customization URL and may further include an optional customization parameter. In another embodiment of the present disclosure, the AIT may include a customization flag indicating whether a broadcasting company provides a customized application. At operation 414, the terminal 406 extracts the customization URL (or URI) indicating the application management server 408a from the AIT.

The terminal 406 transmits user/device information about the terminal 406 to the application management server 408a indicated by the position information (i.e. the customization URL) included in the AIT at operation 416. The application management server 408a determines an address (a URL or URI) of a customized application corresponding to the terminal 406 based on the received user/device information at operation 418 and redirects the application request to the customized application server 408b indicated by the determined URL at operation 420. At operation 422, the customized application server 408b transmits the requested customized application to the terminal 406. The terminal 406 uses the customized application at operation 424.

Figure 5:
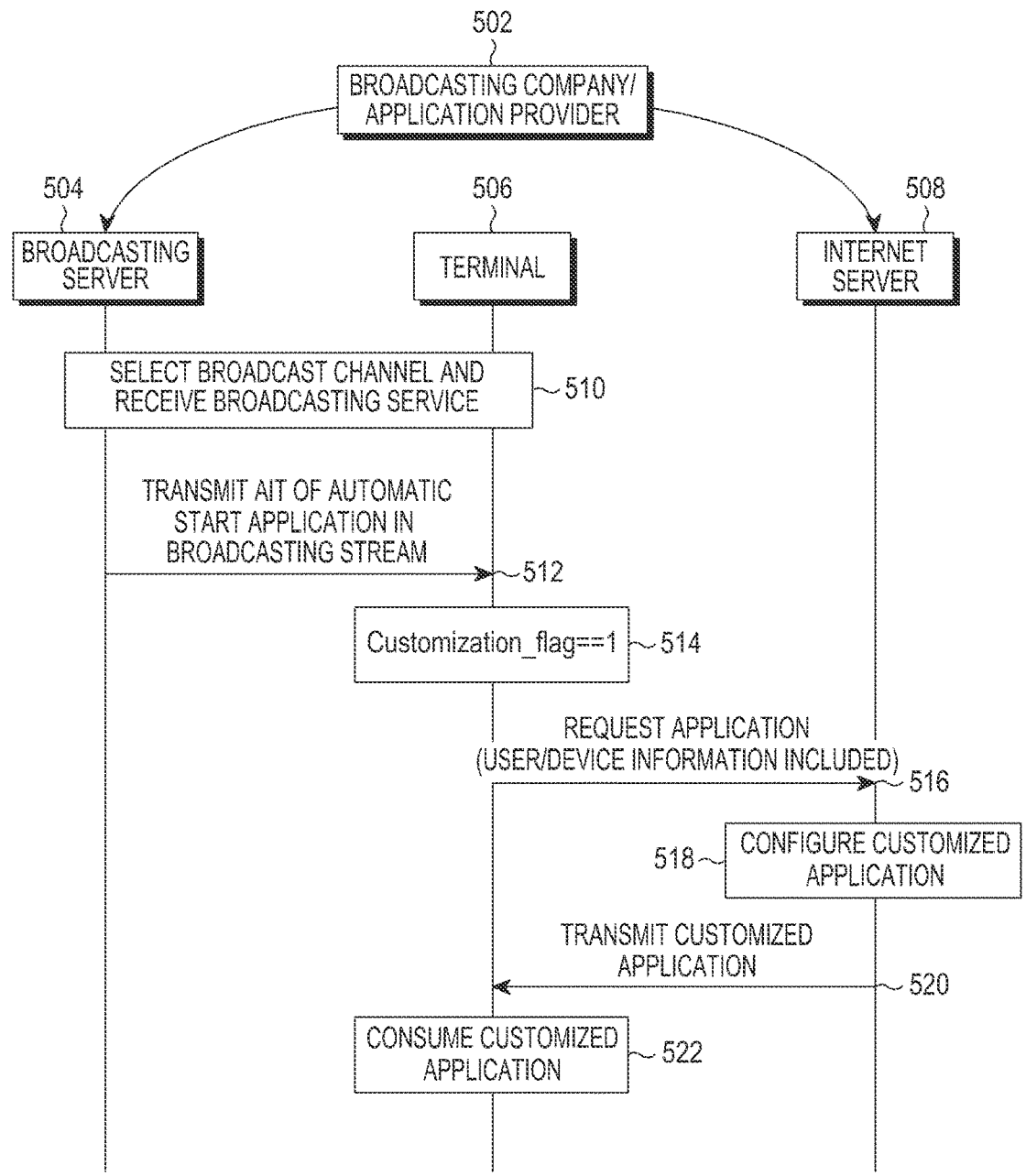
FIG. 5 illustrates an operation of providing a customized application according to an embodiment of the present disclosure.

FIG. 5 illustrates an operation of providing a customized application according to an embodiment of the present disclosure.

Referring to FIG. 5, a broadcasting company/application provider 502 has interfaces with a broadcasting server 504 that provides a broadcasting stream and an Internet server 508. A terminal 506 selects a desired broadcast channel and starts to receive a broadcasting stream including content of a broadcasting service on the selected broadcast channel from the broadcasting server 504 at operation 510. While the terminal 506 is receiving the broadcasting service, the broadcasting server 504 transmits a broadcasting stream including an AIT of an automatic start application to the terminal 506 at operation 512. The AIT may include a customization URL and may further include an optional customization flag indicating whether a broadcasting company provides a customized application.

Table 2 below illustrates an example of an AIT including a customization flag.

TABLE 2

| | |
|---|---|
| application_type | As required, eg Flash or HTML |
| application_control_code | Not used |
| Customization_flag | Indicate whether the application can support customization. If the value is '1', the device should send user/device information to the application URL. |
| application_descriptor( ) | |
|     application_profile_length | 0 (no application profile provided) |
|     service_bound_flag | Set as required |
|     visibility | Not used |
|     application_priority | Set as required |
|     transport_protocol_label | At least one |
| transport_protocol_descriptor( ) | |
|     protocol_id | 0x03 (broadband server) |
|     selector_bytes | Carry the min. application version |
| simple_application_location_descriptor( ) | |
|     initial_path_bytes | Parameters for the application |

While not shown in Table 2, the AIT may further include Customization URL and Customization Parameter.

At operation 514, the terminal 506 determines whether the customization flag included in the AIT is set to '1'. If the customization flag is not set to '1', the terminal 506 requests an application in the procedure illustrated in FIG. 2. On the contrary, if the customization flag is set to '1', the terminal 506 transmits an application request message to the Internet server 508 corresponding to an application position (i.e. the customization URL) included in the AIT at operation 516. The application request message may include user/device information about the terminal 506. At operation 518, the Internet server 508 configures a customized application in response to the request of the terminal 506. The Internet server 508 then transmits the customized application to the terminal 506 at operation 520 and the terminal 506 uses the customized application at operation 522.

In a modified embodiment of the present disclosure, the terminal may request a changed part of an already received application to the Internet server. This is because the already received application may be updated during execution of the application. In this case, the terminal requests the changed part of the executed application to the Internet server by a technique such as Asynchronous JavaScript and eXtensible Markup Language (XML) (AJAX) and receives and display a response to the request.

Figure 6:
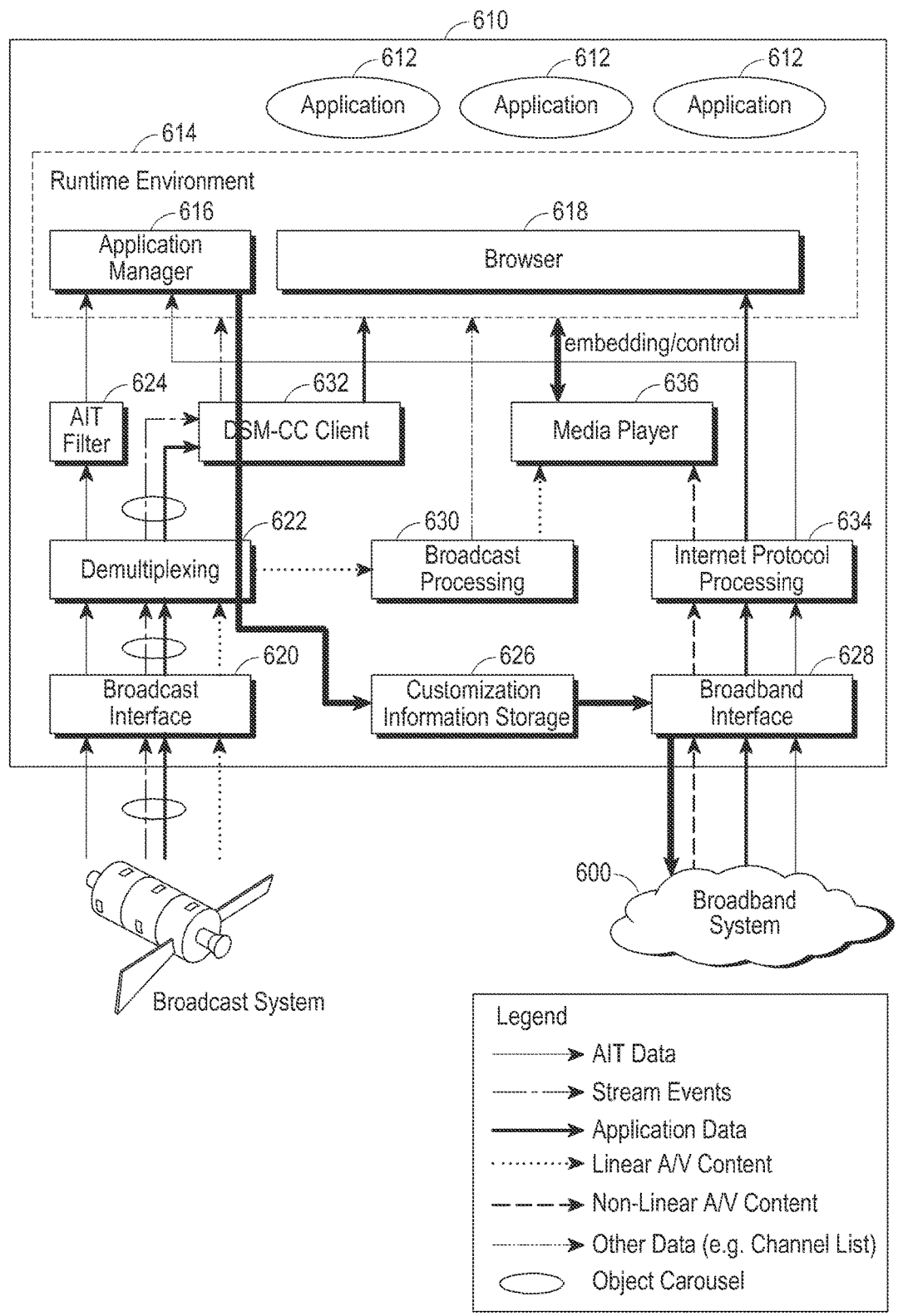
FIG. 6 is a block diagram of a terminal according to an embodiment of the present disclosure.

FIG. 6 is a block diagram of a terminal according to an embodiment of the present disclosure.

Referring to FIG. 6, a terminal 610 receives AIT data, linear A/V content, an application, and a stream event from a broadcasting company through a broadcast interface 620, and provides the received information to an AIT filter 624, a Digital Storage Media Command and Control (DSM-CC) client 632, and a broadcast processor 630 through a demultiplexer 622. The DSM-CC client 632 recovers the last two data streams delivered through a DSM-CC object carousel and provides the recovered data streams to a runtime environment processor 614. While the terminal 610 is configured to further include a customization information storage 626 in addition to the structure of a broadcasting and communication convergence terminal of the related art, it is to be clearly understood that the present disclosure is applicable to the structure of every type of terminal that can access a broadcast channel and a broadband channel.

The runtime environment processor 614 refers to an abstract component that executes interactive applications 612. A browser 618 and an application manager 616 form the runtime environment processor 614. The application manager 616 evaluates AIT data received through the AIT filter 624 and controls the life cycle of an interaction application. The browser 618 executes an interactive application and responds to an operation of an application.

As in a standard Digital Video Broadcasting (DVB) terminal, linear A/V content may be processed by the broadcast processor 630. The broadcast processor 630 is equipped with all DVB functions of the standard DVB terminal. The broadcast processor 630 may provide additional information and functions such as a channel list, an Event Information present/following (EIT p/f) table, and a tuning function to the runtime environment processor 614. If an application 612 modifies (scales and embeds) linear A/V content through a user interface, a media player 636 operates. The media player 636 has functions to process A/V content.

A broadband interface 628 provides Internet connectivity to the terminal 610. The terminal 610 may request to an Internet server of an application provider through the broadband interface 628 and may receive non-linear A/V content such as Content on Demand (CoD). An Internet protocol processor 634 provides functions required for the terminal 610 to process data received from the Internet. More particularly, the Internet protocol processor 634 provides application data to the runtime environment processor 614 and non-linear A/V data to the media player 636.

The application manager 616 checks information included in an AIT received from a broadcasting company through the broadcast interface 620 to determine whether an application corresponding to the AIT supports customization by interpreting the AIT. For example, if a customization flag is '1' in the AIT, a customization URL of an Internet server is included in the AIT, or a URL of an application management server is present in the AIT, the application manager 616 commands the customization information storage 626 to transmit pre-stored user/device information to an Internet server (not shown) in an Internet system 600 through the broadband interface 628.

Figure 7:
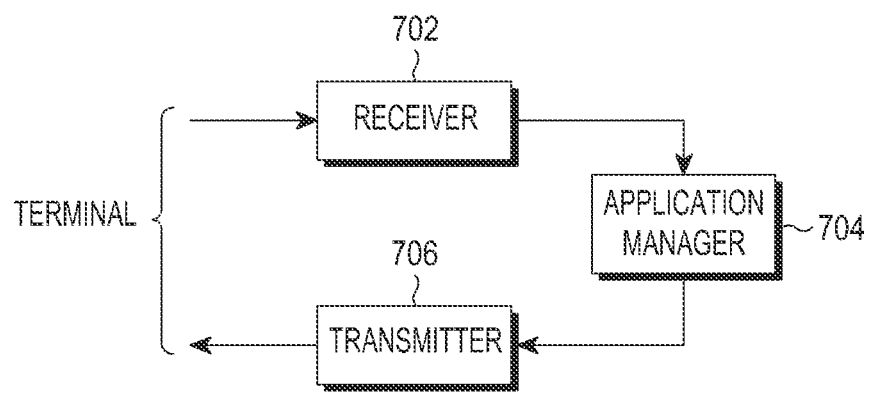
FIG. 7 is a block diagram of an Internet server configured to provide a customized application according to an embodiment of the present disclosure.

FIG. 7 is a block diagram of an Internet server configured to provide a customized application according to an embodiment of the present disclosure.

Referring to FIG. 7, a receiver 702 receives an application request message from a terminal on a broadband channel and provides the application request message to an application manager 704. Upon receipt of the application request message, the application manager 704 determines whether there is pre-stored user/device information about the terminal or the application request message includes the user/device information about the terminal. The application manager 704 configures a customized application for the terminal using the user/device information. A transmitter 706 transmits the customized application to the terminal on a broadband channel.

In another embodiment of the present disclosure, the application manager 704 transmits a general-purpose application configured to allow customization to the terminal through the transmitter 706 in response to an application request message received from the terminal. In another embodiment of the present disclosure, the application manager 704 may determine whether the terminal can customize an application. The determination may be made based on the received application request message or pre-stored information about the terminal. If the terminal requests a customized application and the application manager 704 does not have user/device information about the terminal, the application manager 704 transmits a general-purpose application to the terminal through the transmitter 706.

In another embodiment of the present disclosure, the application manager 704 may be configured to have only a function of extracting a URL of a customized application according to the user/device information about the terminal. In this case, the application manager 704 requests the customized application corresponding to the URL to a customized application server so that the customized application server may transmit the customized application to the terminal.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of providing a broadcasting and communication convergence service, the method comprising:
   acquiring, by a terminal, address information about an internet server in an application information table (AIT) of an automatic start application, the AIT received from a broadcasting server, the internet server configuring an application personalized based on user information of the terminal, wherein the AIT includes a personalization flag corresponding to the automatic start application specifying whether a broadcasting company provides the personalized application or not;
   transmitting, by the terminal, the user information to the internet server on a broadband channel;

transmitting, by the terminal, an application request message to the internet server using the address information, the application request message comprising a personalized application request if the personalization flag indicates that the broadcasting company provides the personalized application, and the application request message comprising a non-personalized application request if the personalization flag indicates that the broadcasting company does not provide the personalized application;

receiving, by the terminal, the personalized application or the non-personalized application on the broadband channel from the internet server in response to the application request message; and consuming, by the terminal, the received personalized application or the non-personalized application.

2. The method of claim 1, wherein the acquiring of the address information about the internet server comprises receiving the address information about the internet server at the terminal by the AIT of the automatic start application provided on the broadcast channel by the broadcasting server.

3. The method of claim 2, wherein the AIT includes a personalization parameter indicating a reference parameter for application personalization.

4. The method of claim 1, wherein the application request message includes the user information in a message header or a body.

5. A method of providing a broadcasting and communication convergence service, the method comprising:

receiving, by an internet server, an application request message requesting an application on a broadband channel from a terminal, the application request being generated based on an application information table (AIT) of an automatic start application received from a broadcasting server by the terminal, wherein the AIT includes a personalization flag corresponding to the automatic start application specifying whether a broadcasting company provides a personalized application or not, the application request message comprising a personalized application request if the personalization flag indicates that the broadcasting company provides the personalized application, and the application request message comprising a non-personalized application request if the personalization flag indicates that the broadcasting company does not provide the personalized application;

receiving, by the internet server, user information from the terminal on the broadband channel;

configuring, by the internet server, the personalized application for the terminal using the user information if the application request message comprises a personalized application request, and configuring the non-personalized application for the terminal if the application request message comprises the non-personalized application request; and transmitting, by the internet server, the personalized application or the non-personalized application on the broadband channel to the terminal in response to the application request message, wherein address information about the internet server is transmitted in the AIT from an internet server application to the terminal.

6. The method of claim 5, wherein the application request message includes the user information in a message header or a body.

7. A terminal for receiving a broadcasting and communication convergence service, the terminal comprising:

a first interface configured to receive address information about an internet server in an application information table (AIT) of an automatic start application, the AIT received from a broadcasting server, the internet server configuring an application personalized based on user information of the terminal, wherein the AIT includes a personalization flag corresponding to the automatic start application specifying whether a broadcasting company provides the personalized application or not;

a second interface configured to:
transmit the user information to the internet server on a broadband channel,
transmit an application request message to the internet server using the address information, the application request message comprising a personalized application request if the personalization flag indicates that the broadcasting company provides the personalized application, and the application request message comprising a non-personalized application request if the personalization flag indicates that the broadcasting company does not provide the personalized application, and
receive the personalized application or the non-personalized application on the broadband channel from the internet server in response to the application request message; and an application processor configured to consume the received personalized application or the non-personalized application.

8. An internet server for providing a broadcasting and communication convergence service, the internet server comprising:

a receiver configured to:
receive an application request message requesting an application on a broadband channel from a terminal, the application request being generated based on an application information table (AIT) of an automatic start application received from a broadcasting server by the terminal, wherein the AIT includes a personalization flag corresponding to the automatic start application specifying whether a broadcasting company provides a personalized application or not, the application request message comprising a personalized application request if the personalization flag indicates that the broadcasting company provides the personalized application, and the application request message comprising a non-personalized application request if the personalization flag indicates that the broadcasting company does not provide the personalized application, and
receive user information from the terminal on the broadband channel;

an application manager configured to configure the personalized application for the terminal using the user information if the application request message comprises a personalized application request, and configuring the non-personalized application for the terminal if the application request message comprises the non-personalized application request; and a transmitter configured to transmit the personalized application or the non-personalized application on the broadband channel to the terminal in response to the application request message, wherein address information about the internet server is transmitted in the AIT from an internet server application to the terminal.

9. A method of providing a broadcasting and communication convergence service, the method comprising:

acquiring, by a terminal, address information about an internet server in an application information table (AIT) of an automatic start application, the AIT received from a broadcasting server, the internet server configuring a general-purpose application that is personalizable according to user information of the terminal, wherein the AIT includes a personalization flag corresponding to the automatic start application specifying whether a broadcasting company provides the general-purpose application or not;

transmitting, by the terminal, the user information to the internet server on a broadband channel;

transmitting, by the terminal, an application request message to the internet server using the address information, the application request message comprising a general-purpose application request if the personalization flag indicates that the broadcasting company provides the general-purpose application, and the application request message comprising a non-general-purpose application request if the personalization flag indicates that the broadcasting company does not provide the general-purpose application;

receiving, by the terminal, the general-purpose application or the non-general-purpose application on the broadband channel from the internet server in response to the application request message;

based on receiving the general-purpose application, configuring, by the terminal, a personalized application from the general-purpose application based on the user information and consuming the personalized application; and based on receiving the non-general-purpose application, consuming, by the terminal, the non-general-purpose application.

10. A method of providing a broadcasting and communication convergence service, the method comprising:

receiving, by an internet server, an application request message requesting an application on a broadband channel from a terminal, the application request being generated based on an application information table (AIT) of an automatic start application received from a broadcasting server by the terminal, wherein the AIT includes a personalization flag corresponding to the automatic start application specifying whether a broadcasting company provides a general-purpose application or, the application request message comprising a general-purpose application request if the personalization flag indicates that the broadcasting company provides the general-purpose application, and the application request message comprising a non-general-purpose application request if the personalization flag indicates that the broadcasting company does not provide the general-purpose application;

receiving, by the internet server, user information from the terminal on the broadband channel; and based on the application request, transmitting, by the internet server, the general-purpose application or the non-general-purpose application to the terminal, wherein the general-purpose application is configured to be used, by the terminal, to configure a personalized application from the general-purpose application based on the user information, the personalized application to be consumed by the terminal, wherein the non-general purpose application is configured to be consumed by the terminal, and wherein address information about the internet server is transmitted in the AIT from an internet server application to the terminal.

11. A method of providing a broadcasting and communication convergence service, the method comprising:

acquiring, by a terminal, address information about a management server in an application information table (AIT) of an automatic start application, the AIT received from a broadcasting server, the management server configuring an application personalized based on user information of the terminal, wherein the AIT includes a personalization flag corresponding to the automatic start application specifying whether a broadcasting company provides the personalized application or not;

transmitting, by the terminal, the user information to the management server on the broadband channel;

transmitting, by the terminal, an application request message to the management server using the address information, the application request message comprising a personalized application request if the personalization flag indicates that the broadcasting company provides the personalized application, and the application request message comprising a non-personalized application request if the personalization flag indicates that the broadcasting company does not provide the personalized application;

receiving, by the terminal, the personalized application or the non-personalized application on the broadband channel from an application server of the internet in response to the application request message; and consuming, by the terminal, the personalized application or the non-personalized application.

12. The method of claim 11, wherein the acquiring of the address information about the management server comprises receiving the address information about the management server at the terminal by the AIT of the automatic start application provided on the broadcast channel by the broadcasting server.

13. The method of claim 12, wherein the AIT includes a personalization parameter indicating a reference parameter for application personalization.

14. The method of claim 11, wherein the application request message includes the user information in a message header or a body.

15. A method of providing a broadcasting and communication convergence service, the method comprising:

receiving, by a management server, an application request message requesting an application on a broadband channel from a terminal, the application request message being generated based on an application information table (AIT) of an automatic start application received from a broadcasting server by the terminal, wherein the AIT includes a personalization flag corresponding to the automatic start application specifying whether a broadcasting company provides a personalized application or not, the application request message comprising a personalized application request if the personalization flag indicates that the broadcasting company provides the personalized application, and the application request message comprising a non-personalized application request if the personalization flag indicates that the broadcasting company does not provide the personalized application;

receiving, by the management server, the user information from the terminal on the broadband channel;

extracting, by the management server, address information about the personalized application or the non-personalized application in response to the application request message;

transmitting, by the management server, the application request message to an application server that provides the personalized application or the non-personalized application using the address information;

configuring, by the application server, the personalized application for the terminal using the user information if the application request message comprising a personalized application request, and configuring the non-personalized application for the terminal if the application request message comprising the non-personalized application request; and transmitting, by the application server, the personalized application or the non-personalized application on the broadband channel to the terminal in response to the application request message, wherein address information about the management server is transmitted in the AIT from an internet server application to the terminal.

* * * * *